United States Patent [19]

Tuma et al.

[11] Patent Number: 5,156,047
[45] Date of Patent: Oct. 20, 1992

[54] WATER SENSOR THAT DETECTS TANKS OR VESSEL LEAKAGE

[75] Inventors: John E. Tuma, Houston; Barry N. Williams, Rosharan; Tommy G. Bogle, Houston, all of Tex.

[73] Assignee: Tanknology Corporation International, Houston, Tex.

[21] Appl. No.: 575,089

[22] Filed: Aug. 30, 1990

[51] Int. Cl.$^5$ .................. G01F 23/26; G01F 23/00
[52] U.S. Cl. .................. 73/304 C; 73/304 R; 340/620
[58] Field of Search .............. 73/304 R, 304 C, 295, 73/299; 340/620; 361/284

[56] References Cited

U.S. PATENT DOCUMENTS

| | | | |
|---|---|---|---|
| 2,836,739 | 5/1958 | Mesh | 73/304 R |
| 3,062,994 | 11/1962 | Mesh | 73/304 R |
| 3,253,280 | 5/1966 | Feyling | |
| 3,952,593 | 4/1976 | Ells | 73/304 R |
| 3,964,311 | 6/1976 | Holman | 73/295 |
| 4,056,978 | 11/1977 | Zimmermann | 73/304 R |
| 4,296,630 | 10/1981 | Jung et al. | 73/304 C |
| 4,382,382 | 5/1983 | Wang | 73/304 R |
| 4,434,657 | 3/1984 | Matsumura et al. | 73/304 C |
| 4,506,540 | 3/1985 | Marsh | 340/604 X |
| 4,736,622 | 4/1988 | Miller et al. | 73/304 R |
| 4,813,284 | 3/1989 | Miller et al. | 73/295 X |
| 4,813,285 | 3/1989 | Brown et al. | 73/295 X |
| 4,864,857 | 9/1989 | Koon | 73/304 C |
| 4,890,492 | 1/1990 | Andrejasich | 73/304 R |

FOREIGN PATENT DOCUMENTS 0069023  5/1980  Japan .................. 73/304 R

Primary Examiner—Stuart S. Levy
Assistant Examiner—Joseph A. Rhoa
Attorney, Agent, or Firm—Vaden, Eickenroht, Thompson, Boulware & Feather

[57] ABSTRACT

A water level sensing probe having a probe body (24), a protective sleeve (28), and an external housing (26) is disclosed. The body contains a detector board (40) that partially protrudes from its bottom and a logic board (42) that partially protrudes from its top. The detector board senses the level of electrically conductive fluid and transmits an indication of that level to the logic board that controls the operation and partially processes the data in response to commands received through a cable (28). The detector board is protected by the protective sleeve (28) while the logic board is enclosed in the external housing (26). The probe is used by positioning on the bottom of a fluid containing tank or other vessel. Water at the bottom of the tank forms a bridging contact between a ground plane and a number of traces on the detector board proportional to the level of the water. The detector board then sends an electrical signal to the logic board which partially processes the signal and sends outside the probe for additional processing.

3 Claims, 4 Drawing Sheets

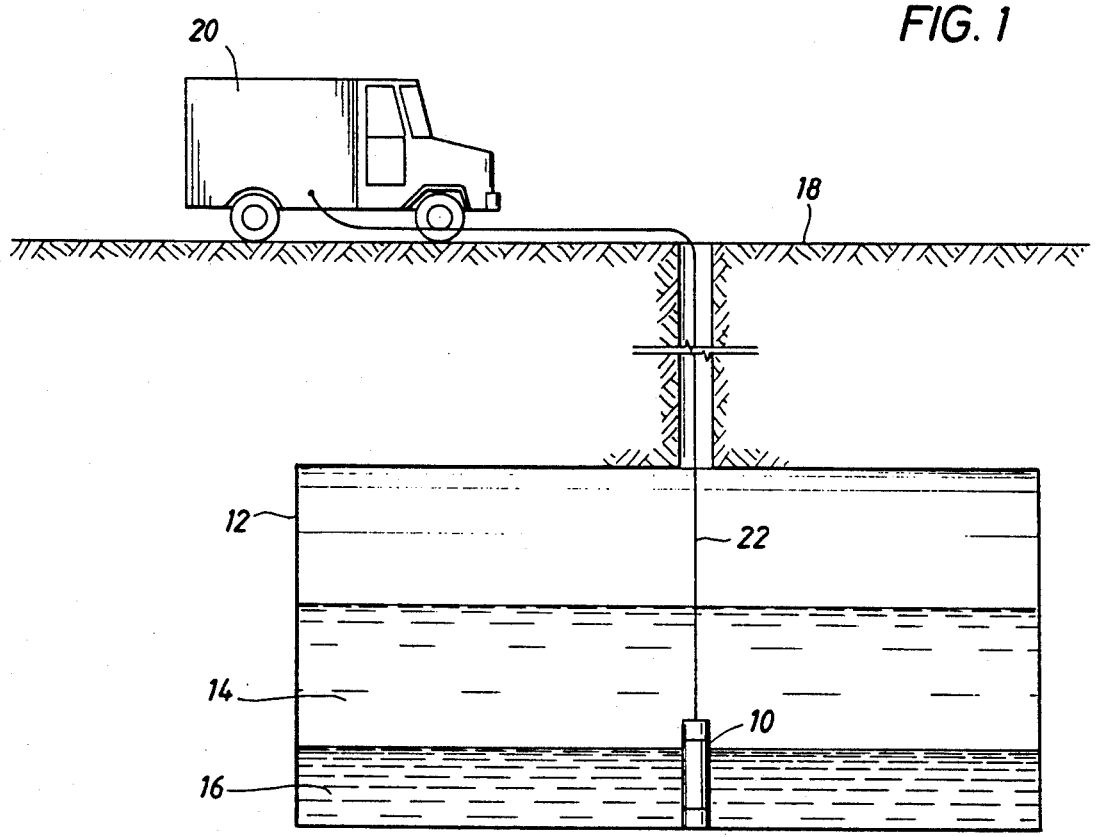
FIG. 1
FIG. 3
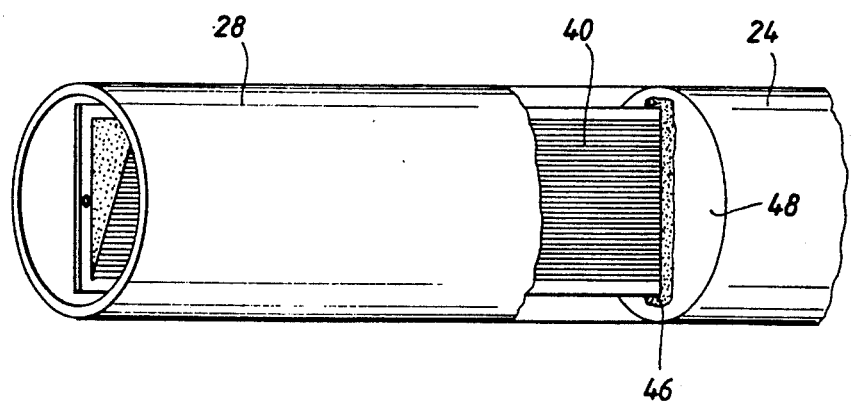

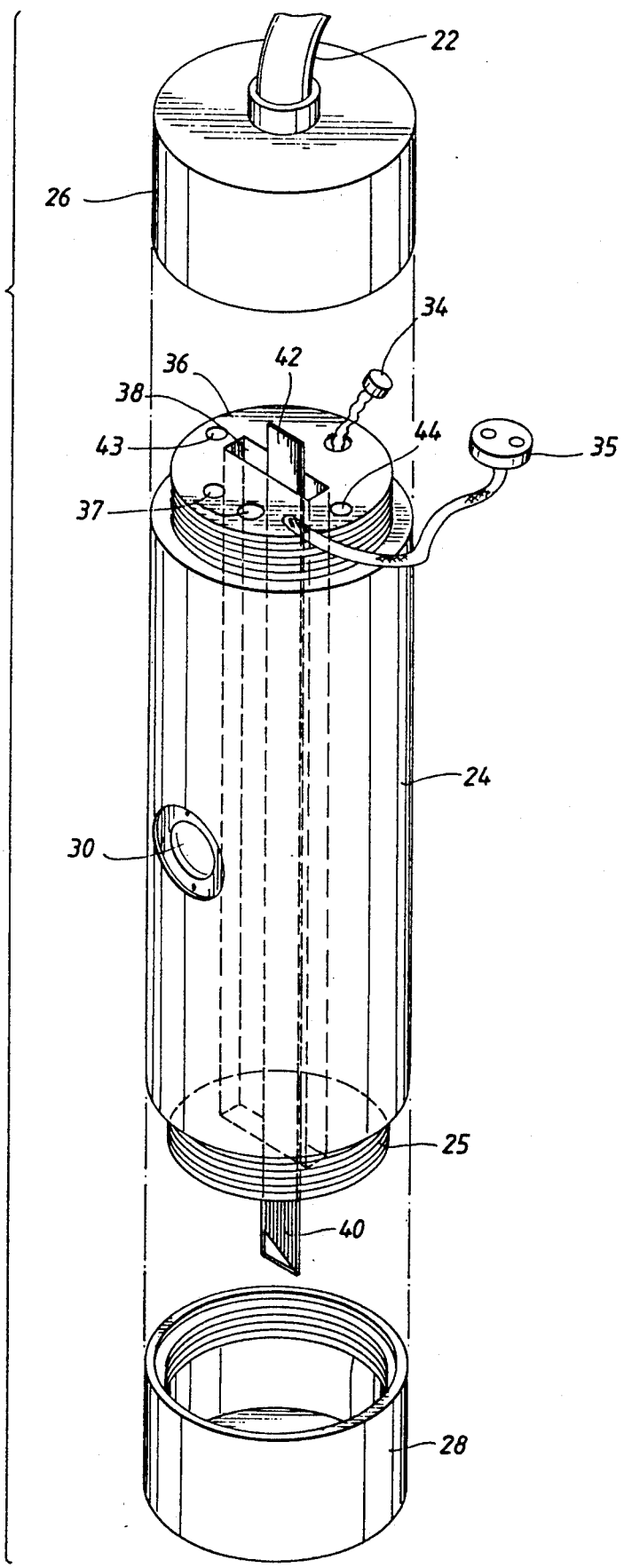

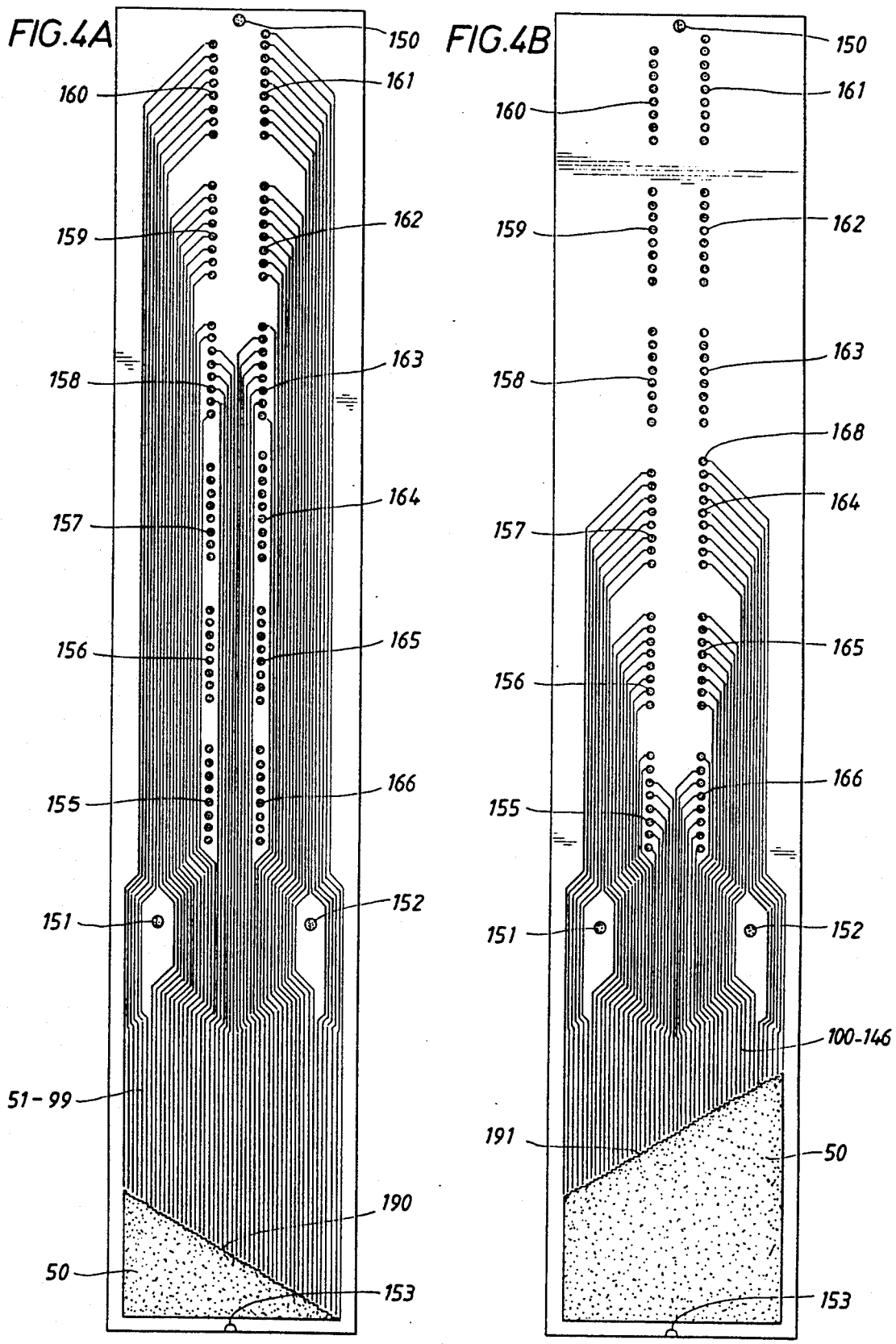

WATER SENSOR THAT DETECTS TANKS OR VESSEL LEAKAGE

BACKGROUND OF THE INVENTION

1. Field of the Invention

This invention pertains generally to a method and apparatus for detecting a leak in a container by measuring the level of an electrically conductive fluid contained therein. More specifically, it relates to detecting a leak in an underground petrochemical storage tank by measuring the level of the water in the tank.

2. Description of the Prior Art

For many years there have been concerted efforts in the petrochemical industry to prevent environmental contamination resulting from leaks in underground storage vessels. Underground storage tanks are not only found in refineries and other large facilities, but also in gasoline service stations. Such locations may have as many as three or four such tanks and consequently there are a large number of these tanks dispersed over an incredibly large area.

The governments of the United States and other countries have for some time issued and enforced regulations requiring the detection and correction of leaks in an effort to prevent environmental damage, particularly contamination of underground water supplies. A sizable industry has developed to provide the technology and skills needed to enable service station owners and others to comply with these federal regulations. Compliance typically involves transporting manpower and materials to the site of the tank and performing a series of tests designed to measure certain conditions inside the tank on a regular basis. These conditions yield indications of whether a leak exists and, preferably, the size of the leak. In the United States, the federal government now also regulates and certifies the instruments used in these tests.

One commonly tested condition is the level of water in the tank. A leak that allows a chemical to seep from a tank into the environment also allows water to seep into the tank. Because water is immiscible with many chemicals and fuels, and because water is heavier than gasoline, the two fluids separate into two layers with the water on the bottom. It is therefore possible to position a probe on the bottom of the tank to measure the level of water in the tank. By monitoring the change in the level of the water over a preselected period of time, it is possible to determine whether a leak exists and the size of the leak.

Many of these tests take advantage of the electrical conductivity of the water which leaks into the tank. It is well known that gasoline is a very poor conductor of electricity. It is also well known that pure water is also a poor conductor, but very little water that seeps into a tank is pure. The water in the tank usually has a fairly high degree of ionic activity that renders it electrically conductive. It is therefore possible to detect and quantify the impure water in the tank by measuring the level of this electrically conductive fluid once the water and gasoline have separated into their respective layers, and such methods are known in the art. However, the known methods, and the apparatus used in those methods, are characterized by a number of disadvantages and limitations which limit their capabilities and increase their cost.

An example of such a limitation is that in the United States, federal regulations require instruments for use in testing gasoline storage tanks to detect leaks as small as 0.1 gal/hr. Further, these tanks can have extremely large dimensions. Such large dimensions sometimes result in a very thin layer of water in the tank, having a depth perhaps as small as 0.020 inches. Because of the thin (or shallow) layer of water and the slow rate of change, a depth measuring device must therefore be capable of operating with relatively high resolution and precision. Because of the limited resolution capabilities of known methods for quantifying the influx of water and the long time required for sufficient water to leak into the tank to be able to be detected by these known devices as a result of their limited resolution, known methods may require several hours of testing time per tank. In installations in which there are several tanks, the time required to test each tank causes testing costs to approach the prohibitive level.

Known probes for use in quantifying the water in a tank are comprised of a plurality of alternating conductive and insulating disc or plates which are pressed onto a post extending out of the distal end of the probe, e.g., the end opposite the end which is attached to the electrical cable from which the probe is suspended in the tank. Each conductor is separately wired in parallel into a resistor network for summing the current pulsed into the post, the water completing the circuit to the extent that the water covers a certain number of the conductive plates. It is this construction which limits the resolution of known methods because the plates cannot be made in but a certain minimum thickness to allow them to be handled and to withstand the physical stresses of being mounted on the post. Further, the alternating plates and insulators must be retained on the end of the post, and a relatively thick (compared to the thickness of the plates) retainer, shaped like the plates, is generally used for that purpose. Consequently, even when the distal end of that post is positioned on the floor of the tank being tested (and particulate matter may prevent such positioning), it is not possible to detect a layer of water that is thinner, or shallower, than the thickness of that retainer.

There are many other disadvantages of probes of this construction. For instance, because of the conditions in which the probe is used and the stresses resulting from the above-described construction, the plates, post and probe must be manufactured from stainless steel, a material which is notoriously expensive to mill and fabricate (especially in the minimum thickness of the plates). Further, the plates must be assembled onto the post and then hard wired in separate connections, both of which are time-consuming processes. Also, because of the use of the electrically conductive water to complete a circuit, the salts in the water plate onto the plates during the test, decreasing current flow to the point that the deposits must be cleaned from the plates at regular intervals.

Another disadvantage of such known probes is their length. These probes are generally cylindrical and, in addition to housing the circuitry for quantifying the influx of water into the tank, include the necessary components for sensing temperature (for correcting depth changes for changes in temperature which cause volume changes) and for detecting the bubbles created in the fluid in the influx of air. The latter function results from a leak test which is conducted by evacuating the ullage in the tank and detecting the bubbles formed in the fluid in the tank by the air which enters the tank below the surface of the fluid in accordance with the method described in U.S. Pat. No. 4,462,249, assigned to the owner of the present invention and hereby incorporated herein in its entirety by this specific reference thereto. A hydrophone is mounted in the probe body for detecting the resulting bubbles, but due to the length of the probe body and the post extending from one end of the probe for retaining the plates and insulators, when the distal end of the post rests on the bottom of the tank, the hydrophone is positioned about eighteen inches above the bottom of the tank. This long length also results from the space necessary to individually wire each conductor into the resistor network. Of course, the hydrophone must be submerged to function properly, and the size requirements resulting from this construction are such that the tank must contain a minimum of about eighteen inches of fluid to insure that the hydrophone is submerged. There are many circumstances in which that minimum depth requirement causes problems. For instance, when a testing crew arrives on site and discovers that a gasoline service station storage tank does not include that minimum depth of product, the station operator must buy more product. Additional product takes time to procure and costs extra because of the unscheduled nature of the delivery. Another alternative which is also costly is that the testing crew must return at another time.

It is, therefore, a principal object of the present invention to provide a method and apparatus capable of overcoming these disadvantages and limitations of prior known methods and apparatus for detecting leaks in storage tanks.

It is also an object of this invention to provide a method and apparatus that measures the level of an electrically conductive fluid in a vessel, and in particular, in a vessel, containing immiscible fluids with a high degree of resolution.

It is also a feature of this invention that such an apparatus be sufficiently small and lightweight so that it can be easily transported to different varying locations.

It is a further feature of this invention that the apparatus be compatible with existing technology in the industry.

It is still a further feature of this invention that the apparatus complies with current federal regulations regarding operation and performance of these types of instruments and that, if properly used, it will enable gasoline storage tank operators and owners to also comply with federal regulations.

SUMMARY OF THE INVENTION

The invention is a water level sensing probe and a method for using such a probe. The probe is comprised of a probe body, a protective sleeve, and an external housing. The body contains a detector board that partially protrudes from the bottom of the probe and the logic circuitry for controlling the operation of the probe. The detector board senses the level of electrically conductive fluid and transmits an indication of that level to the logic board, which partially processes the data in response to commands received through the cable from which the probe is suspended in the tank. The detector board is protected by the protective sleeve, which is mounted to the external housing.

The probe is used by positioning the detector board on the bottom of the tank and pulsing an electrical current therethrough. Water or other electrically conductive fluid at the bottom of the tank forms a bridging contact between a ground plane and a number of substantially parallel, longitudinal traces on the detector board, each trace being of progressively longer length such that the number of traces submerged, and therefore, the amount of current passing through the conductive fluid, is proportional to the depth or level of the fluid. The logic board partially processes the output signals from the detector board and sends the signal outside the probe for additional processing.

BRIEF DESCRIPTION OF THE DRAWINGS

So that the manner in which the above recited features and advantages of the invention, as well as others that will become apparent, are attained and can be understood in detail, a more particular description of the invention briefly summarized above may be had by reference to the exemplary preferred embodiment illustrated in the drawings that form a part of this specification. It is to be noted that these drawings illustrate only a typical preferred embodiment of the invention and are not to be considered limiting of its scope as the invention may admit to other equally effective embodiments.

FIG. 1 generally illustrates the use of the invention in its operational environment.

FIG. 2 is an exploded, perspective view of a presently preferred embodiment of the apparatus of the invention.

FIG. 3 is a cutaway, perspective view of the bottom, or distal end of the apparatus of FIG. 2.

FIGS. 4A and 4B illustrate the layout of traces on the front and back of the printed-circuit detector board of the apparatus of FIG. 2.

DESCRIPTION OF THE PREFERRED EMBODIMENT

Figure 5:
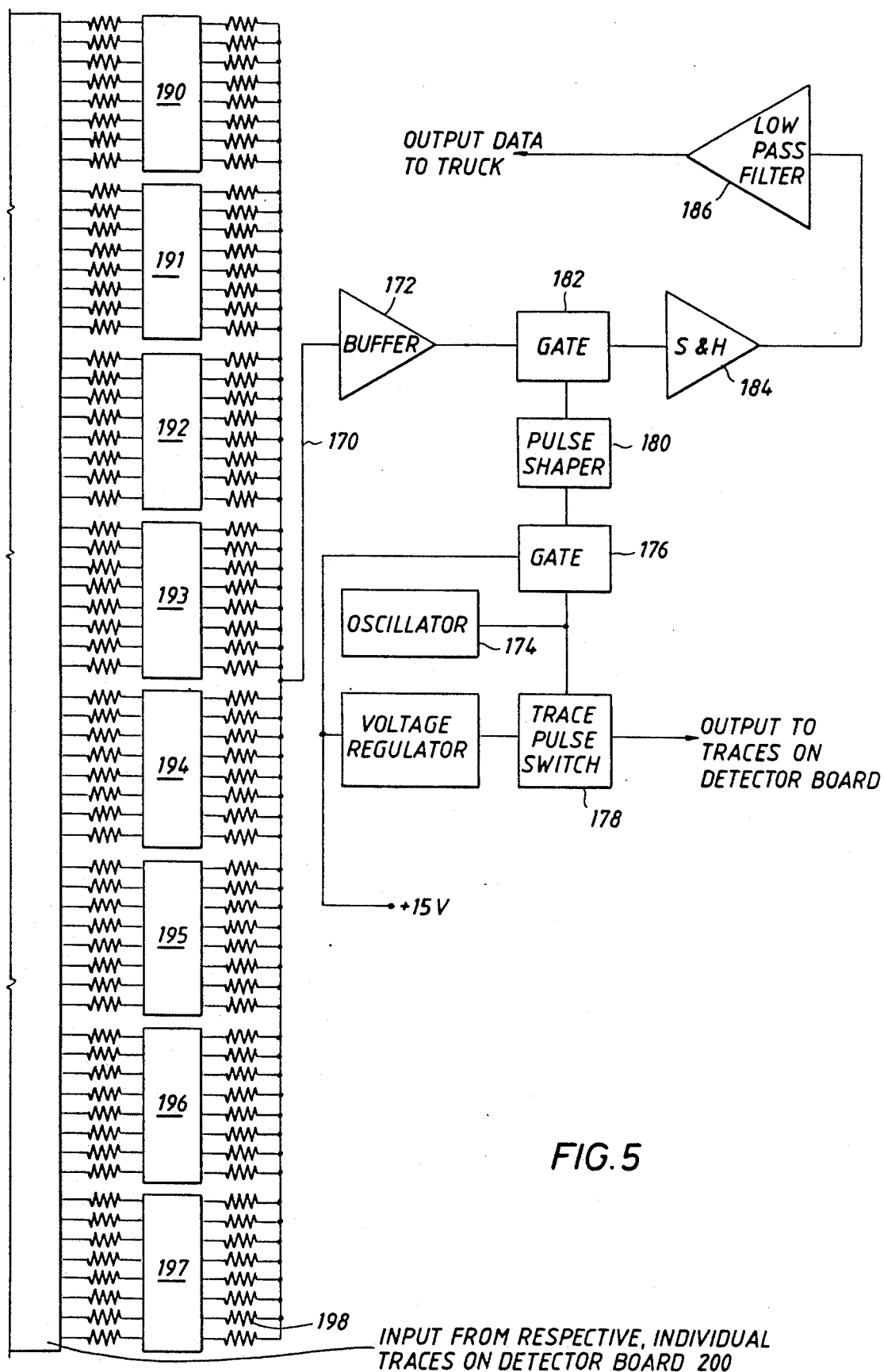
FIG. 5 shows a block diagram of the circuitry of the logic board of the apparatus of FIG. 2.

FIG. 1 depicts water level probe 10 positioned on the bottom of vessel 12. Vessel 12 is partially filled with layers of a fluid such as gasoline 14 and an electrically conductive fluid such as water 16. Although vessel 12 is only partially filled, the practice of the invention is equally effective in tanks that are completely full. Gasoline 14 and water 16 are immiscible and therefore layer, the heavier fluid (water 16) layering beneath the lighter. Vessel 12 is located beneath ground surface 18 and probe 10 is connected to a truck 20 via cable 22 and suspended in tank or vessel 12 by that cable. Truck 20 stores and processes electronic data collected and transmitted by probe 10 to truck 20 via cable 22. The methods and electronics necessary for transmitting and processing the data can be any of several well known to those ordinarily skilled in the art.

FIG. 2 depicts probe 10 in greater detail and in an exploded view. Probe 10 generally comprises probe body 24 to which external housing 26 and protective sleeve 28 are mounted on the threads at either end of probe body 24. Probe body 24, in the preferred embodiment, is typically constructed from a solid, cylindrical slug of aluminum in which the threads on both ends are milled. The preferred embodiment of probe body 24 is provided with a hydrophone mounting means 30 located on the side of and oriented perpendicularly to the length of probe body 24. Probe body 24 also includes a temperature sensor mounting means 37 and pressure transducer 34 located on the top 36 of probe body 24. Connector 35 mates with a connector (not shown) on the inside of external housing 26 to connect logic board 42 to cable 22.

Still referring to FIG. 2, probe body 24 is provided with a slot 38 milled throughout its length in which detector board 40 and logic board 42 are mounted and secured. Both detector board 40 and logic board 42 are printed circuit boards and may be of any construction known to those skilled in the art who have the benefit of this disclosure. Logic board 42 is secured on its top end with a bracket (not shown) mounted to holes 43-44 on the top 36 of probe body 24. Logic board 42 and detector board 40 are mounted to each other in a piggy-back fashion hereafter described so that detector board 40 derives some structural stability from the bracket mounted in holes 43-44. Slot 38 is filled with an epoxy 46 or other type of resinous material (shown in FIG. 3) that hardens around both detector board 40 and logic board 42. When epoxy 46 hardens, it provides additional structural stability for securing detector board 40 and logic board 42 within slot 38.

FIG. 3 depicts the bottom of probe 10 from the opposite perspective of FIG. 2. Protective sleeve 28 is shown mounted to probe body 24 on threads 25 (see FIG. 2) over the part of detector board 40 protruding from the bottom, or distal end, 48 of probe body 24. The detector board 40 protrudes from bottom 48 of probe body 24 through slot 38. Protective sleeve 28 allows detector board 40 to be exposed to the fluids in vessel 12 while resting on the bottom of the vessel 12 without damage to the distal, protruding end 41 of detector board 40 that may otherwise be caused by detector board 40 contacting the bottom of vessel 12 with too much force. FIG. 3 also illustrates that the epoxy 46 does not extend, at least not more than marginally, beyond bottom 48 of probe body 24. As noted earlier, epoxy 46 fills slot 38 and surrounds those portions of detector board 40 and logic board 42 within slot 38 to impart structural stability when hardened. Epoxy 46 also serves to environmentally isolate those portions of boards 40 and 42 from the fluids in vessel 12 so that, in the event any of the fluids are electrically conductive, the fluids will not short circuit the operation of the electrical circuits contained therein.

FIGS. 4A and 4B illustrate the layout of ground plane 50 and a plurality of substantially parallel traces 51-147 of progressively longer lengths on the front and back, respectively, of detector board 40. Traces 51-99 are patterned on the front while traces 100-146 are patterned on the back. Traces 51-147 and ground plane 50 are etched in the preferred embodiment, but may be applied to the surface of detector board 40 using any other commonly known technology in the art, such as masking. In a presently preferred embodiment, the afore-mentioned plating problem is solved by the use of gold in the traces patterned onto detector board 40. Mounts 155-166 are comprised of the terminals for traces 51-147 and are used to mount 74HC540 octal buffers to receive electrical signals from traces 51-147 until the signals are input to logic board 42. Terminal 168 receives ground from logic board 42 to provide ground for ground plane 50. The number of traces on detector board 40 determines the level of resolution that probe 10 measures and can vary from the number shown in the preferred embodiment. However, substantially more traces can be patterned onto detector board 42 than the number of conductive plates which can be assembled onto the post of the above-described prior art probes, thereby significantly increasing the resolution of probe 10.

The octal buffers 190-197 (see FIG. 5) are first mounted to logic board 42 using wire-wrap mounts so that the wire-wrap pins extend beyond the side of logic boards 42 opposite to which they are mounted. Unused pins from the buffers are clipped, but the remaining pins are fitted into their respective holes in mounts 155-156 whereupon they are clipped and soldered. In this manner, buffers 190-197 are mounted to both logic board 42 and detector board 40 and the boards are piggy-backed to each other. The piggy-backed mounting of the two boards 40 and 42 in this manner, made possible by the use of a printed circuit board as the detector element, significantly reduces the overall length of the probe 10 and the time required for assembly of same compared to prior art probes. The signals generated by the submerged traces are thereby transmitted from detector board 40 to buffers 190-197 and board 42 for processing and transmission to truck 20. Logic board 42 and detector board 40 do not need to be piggy-backed in this or any other manner to practice the invention, but only need to be secured within slot 38 and environmentally isolated from the fluids in vessel 12, and be electrically connected so that the data acquired by detector board 40 can be transmitted to logic board 42 for partial processing and transmission to truck 20.

FIG. 5 is a block diagram of the circuitry of logic board 42. The actual designs necessary to implement the labeled functions are well known in the art and may be any one of many to perform the given function. Buffers 190-197 receive inputs from the respective, individual traces (51-147) on detector board 40. Traces 51-147 are generally designated 200 and are not shown individually in FIG. 5 for the sake of clarity. The outputs of buffers 190-197 are then summed to obtain input 170 for buffer 172. Oscillator 174 drives both gate 176, which controls operation of pulse shaper 180, and trace pulse switch 178, which sends a pulse of electrical current to traces 51-147. Pulse shaper 180 controls operation of gate 182, which in turn controls the flow of input 170 through buffer 172 to sample and hold 184 and lowpass filter 186 to be transmitted via cable 22 to truck 20 (both shown in FIG. 1).

An electrically conductive fluid forms a bridging contact for one or more of traces 51-147 with ground plane 50, thereby creating a plurality of parallel resistances. As can be seen in FIGS. 4A and 4B, upper edges 190-191 of ground plane 50 on the front and back, respectively, of detector board 40 have a "stair-step" structure so that each successively shorter trace 51-147 is separated from the upper edges 190-191 of ground plane 50 by a substantially equivalent gap. Increasing levels of electrically conductive fluid therefore create a bridging contact between ground plane 50 and an increasing number of traces 151-147. The octal buffers 190-197 (in FIG. 5) mounted on mounts 155-166 continually determine whether each one of traces 51-147 have been bridged to ground plane 50 by electrically conductive fluid and output an electrical signal indicating the state of each trace. These outputs are summed by the hard-wired summing circuit comprised of resistor network 198, the resultant signal constituting the input 170 to buffer 172 on logic board 42.

In operation, power is transmitted from truck 20 via cable 22 to probe 10 once probe 10 is lowered to the bottom of vessel 12 and the test starts. The power transmitted from truck 20 powers oscillator 174 to drive gate 176 and trace pulse switch 178. It is important that the flow of input 170 to sample and hold 184 be synchronized with trace pulsing to ensure that power is being transmitted through each of traces 51-147 and that all timing delays inherent from the use of electronic components have been overcome when the data is sampled. This synchronization is accomplished in the preferred embodiment by controlling both trace pulse switch 178 and gate 176 (and thereby gate 182 through pulse shaper 180). The timing is preferably such that traces 51-146 are pulsed on before gate 182 is opened so that sample and hold 184 samples input 172. The inverse is also true, i.e., gate 182 is closed to prevent sample and hold 184 from sampling input 173 before traces 51-146 are "unpulsed" by trace pulse switch 178. The process of pulsing the traces, sampling the data, and unpulsing the traces is repeated on a periodic basis for a preselected period of time during the test, and each set of data acquired and partially processed by probe 10 is transmitted up cable 22 to truck 20 for further processing. Such processing is accomplished in accordance with methods known in the art to produce, for instance, a printed record of the rate of change in the level of the electrically conductive fluid in vessel 12. Those skilled in the art who have the benefit of this disclosure will recognize that the processing of the acquired data could be accomplished entirely by suitable electronic equipment located in truck 20. Other changes and modifications to the presently preferred embodiment illustrated and described above will be apparent to such persons, and all such changes are included within the spirit and scope of the invention as set out in the following claims.

What is claimed is:

1. An apparatus for detecting the level of an electrically conductive fluid in a vessel comprising:
   a cylindrical probe body having a longitudinal slot therethrough;
   a detector board in the slot that protrudes at least partially from the bottom of said probe body;
   a logic board connected to said detector board in the slot of said probe body; and
   a layer of epoxy surrounding the portions of said detector and logic boards in the slot and filling the slot to environmentally isolate the portions of said detector and logic boards in the slot from the fluids.

2. An apparatus for detecting the level of an electrically conductive fluid in a vessel comprising:
   a cylindrical probe body having a slot in one end thereof;
   a detector board protruding out of said body through the slot and having a plurality of substantially parallel electrically conductive traces patterned thereon, each conductive trace extending from the edge of said detector board furthest from said body along the surface of the length of said detector board to a different length; and
   logic means mounted in said body for receiving an input from each conductive trace on said detector board to sum the current therefrom and output a signal proportional to the number of conductive traces submerged in the electrically conductive fluid in a vessel.

3. The apparatus of claim 2 additionally comprising a ground plane on said detector board, the electrically conductive fluid closing a circuit between the submerged conductive traces and said ground plane.

* * * * *